3,043,415
Patented July 10, 1962

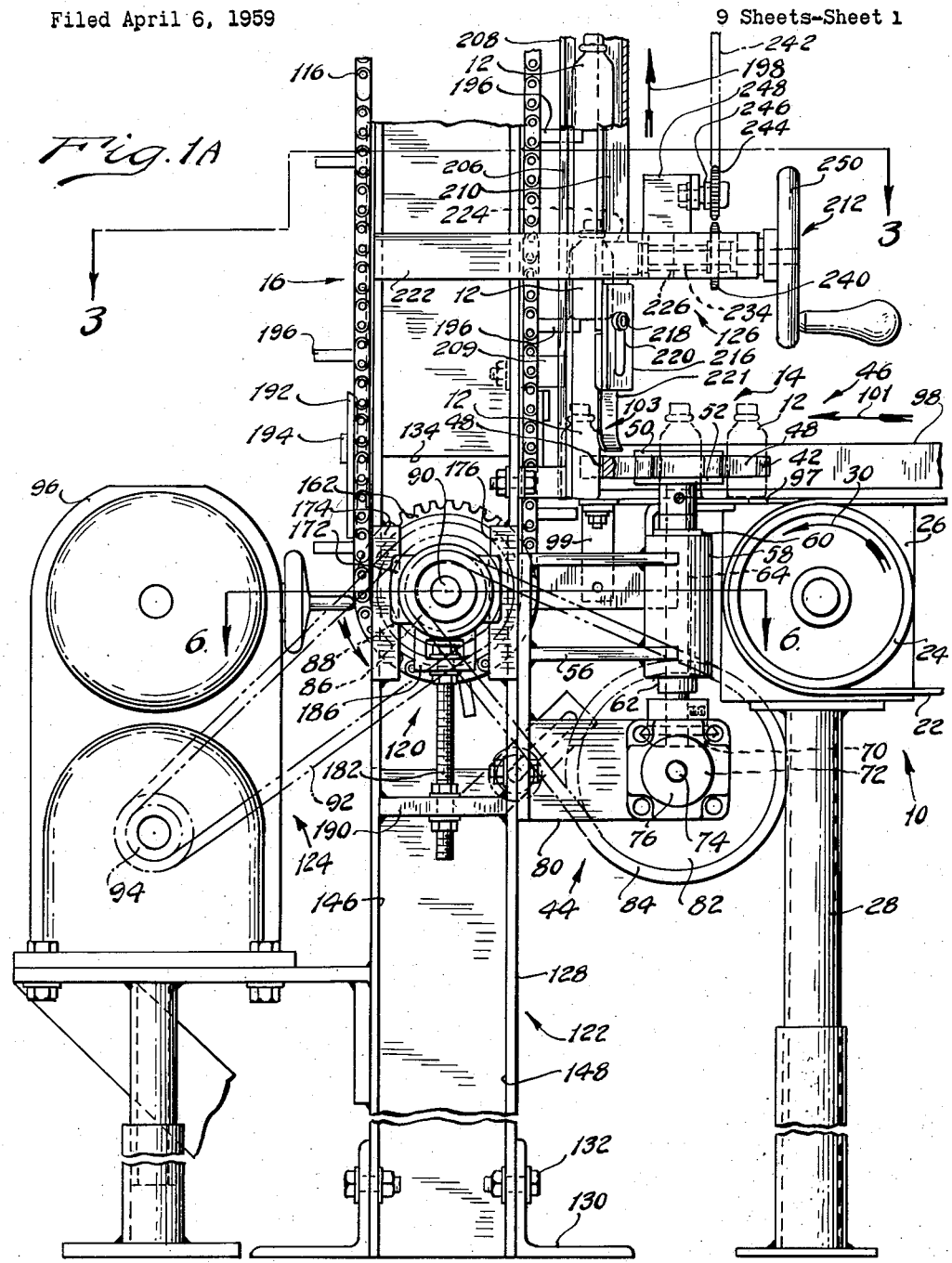

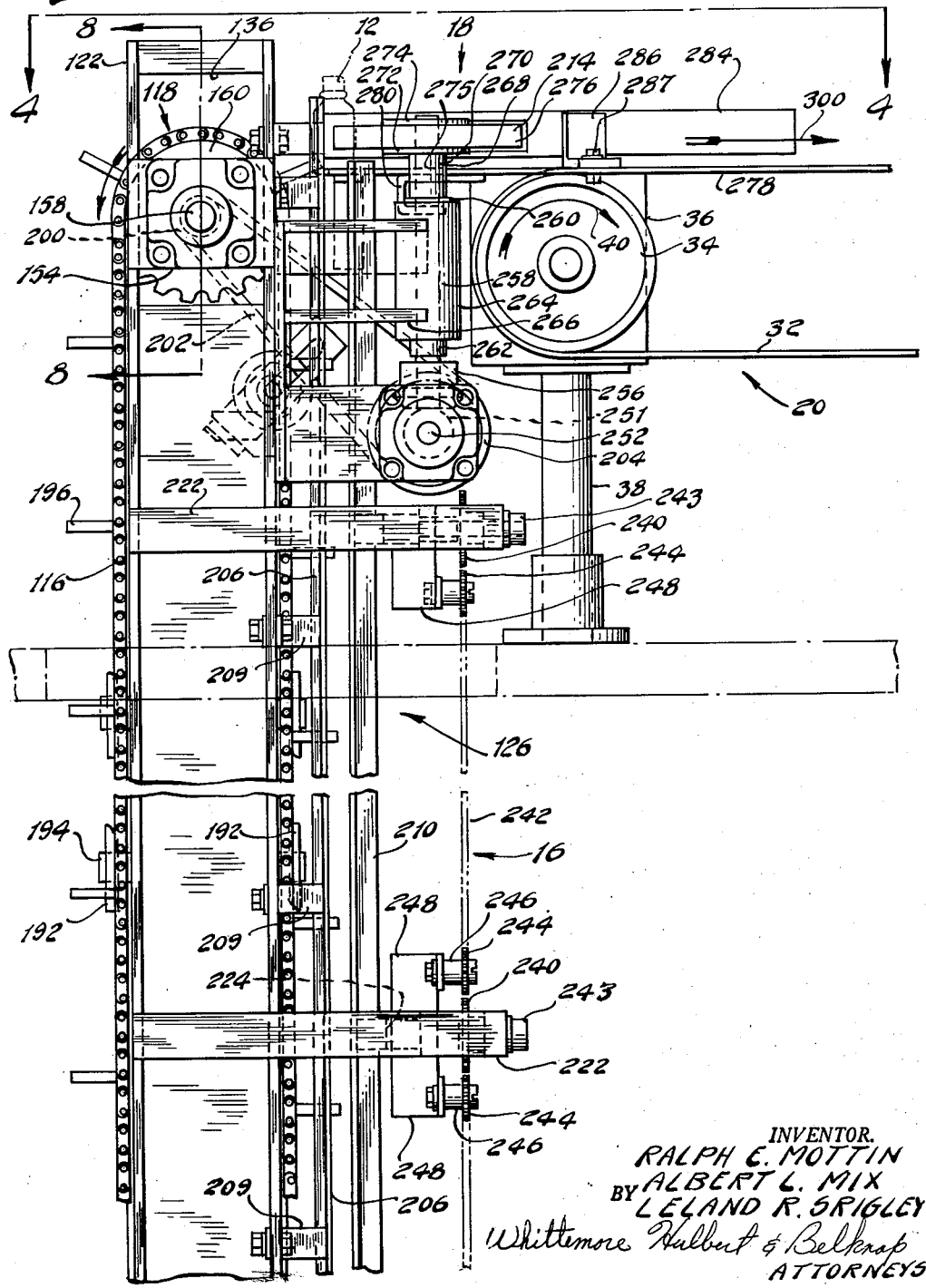

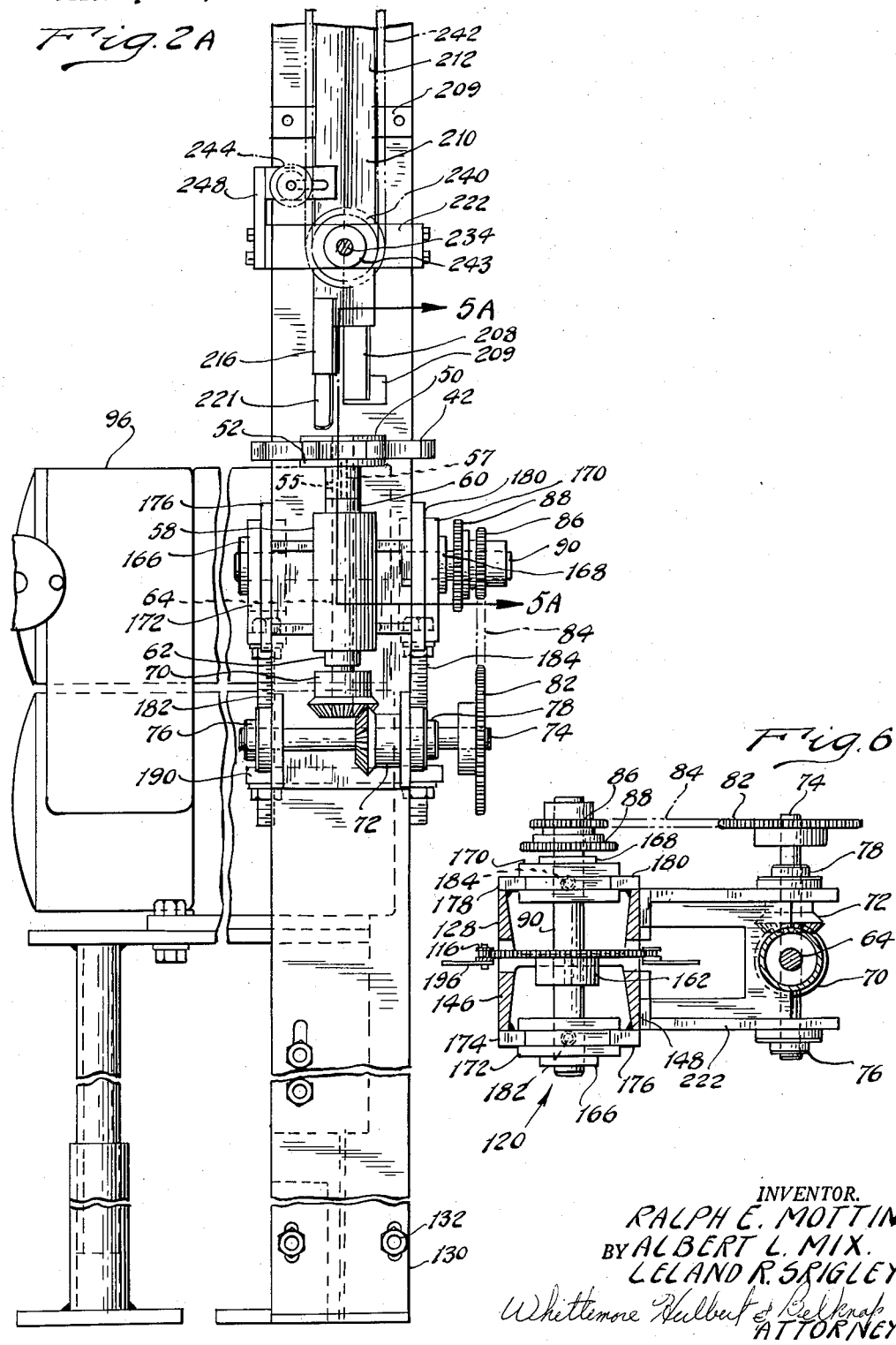

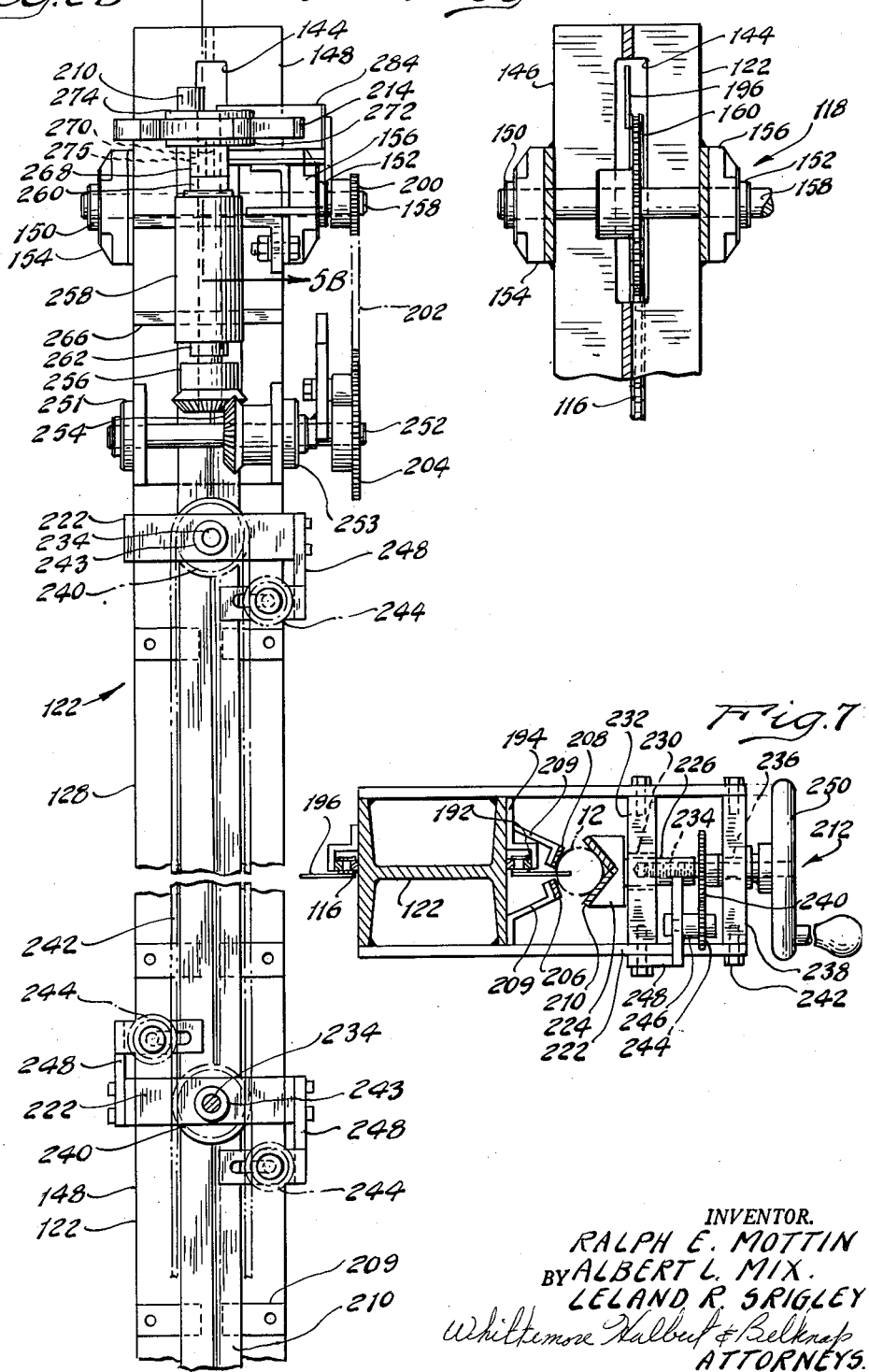

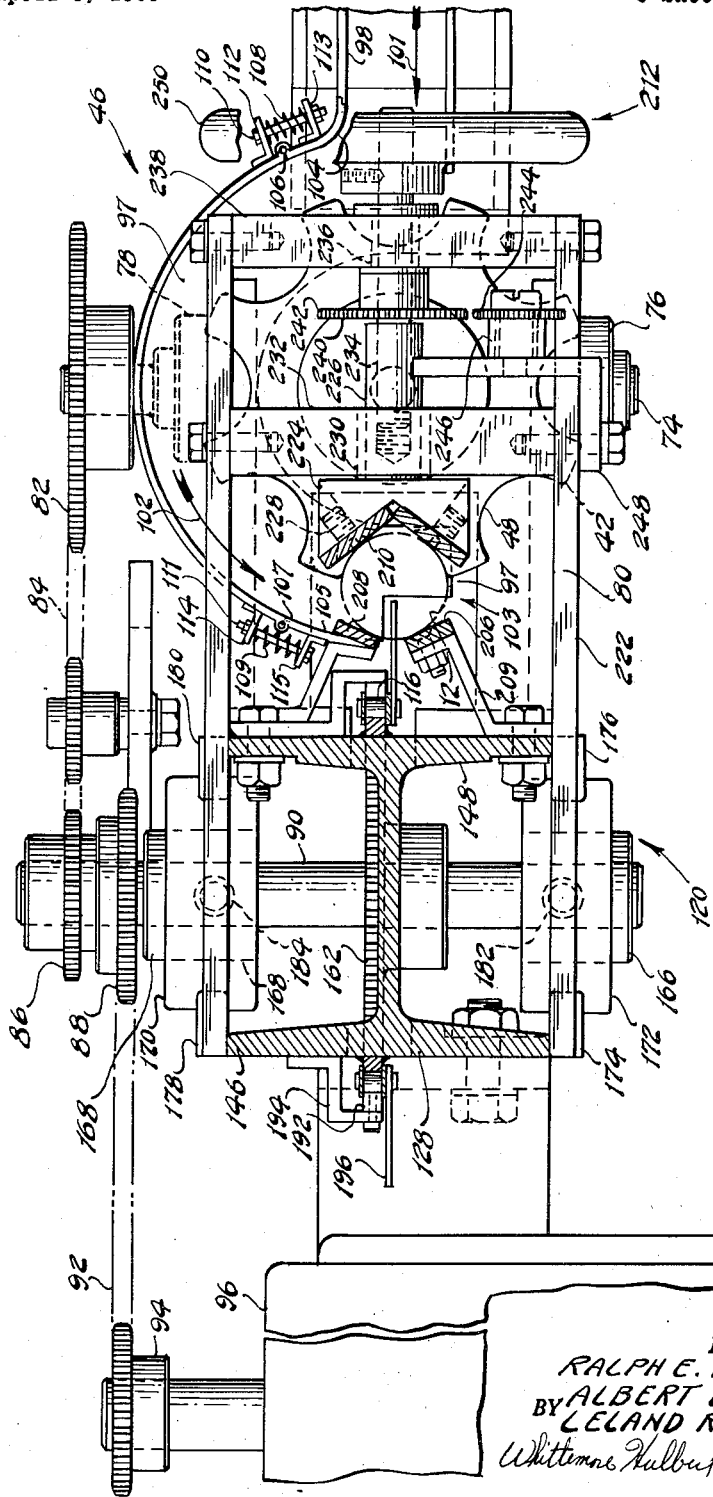

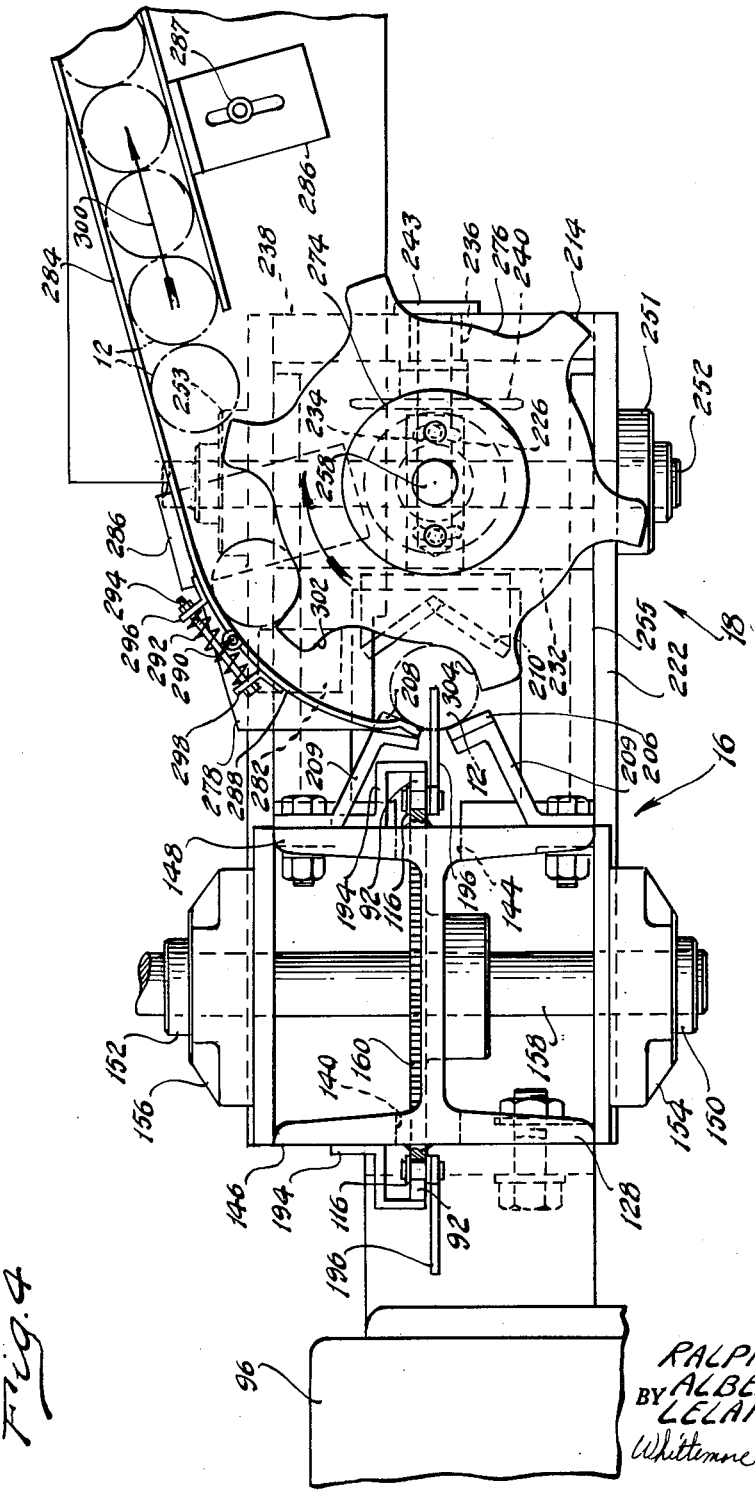

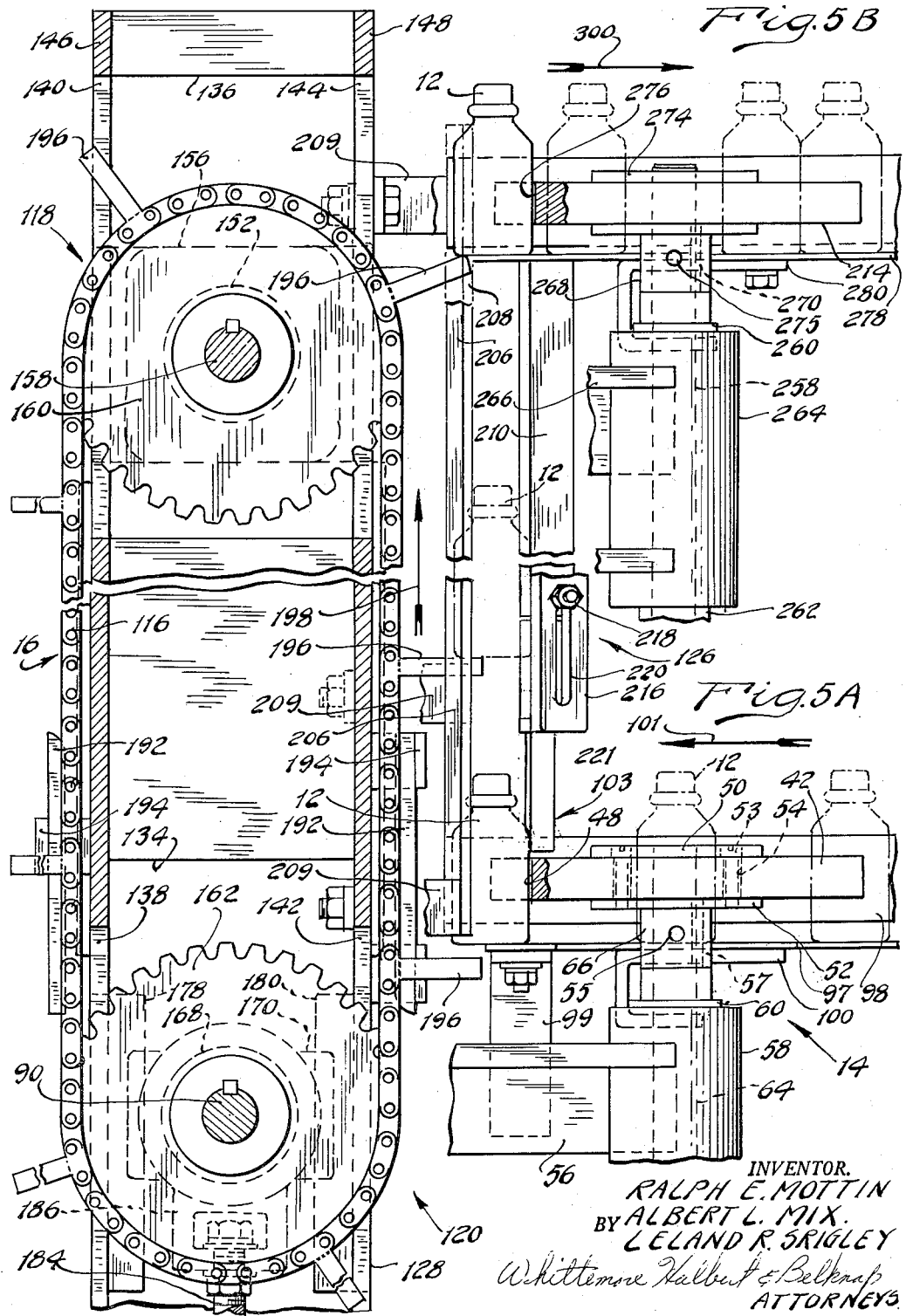

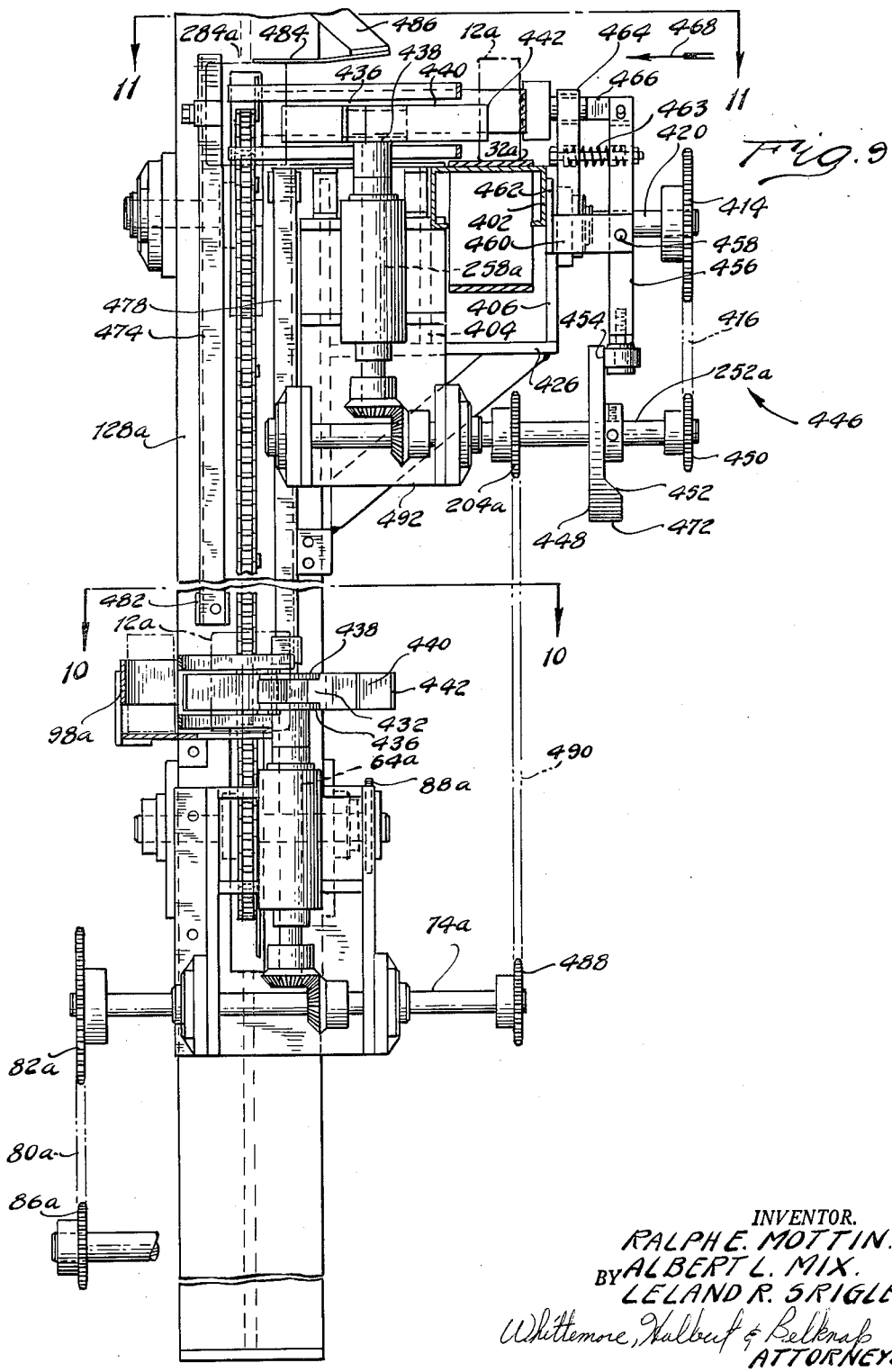

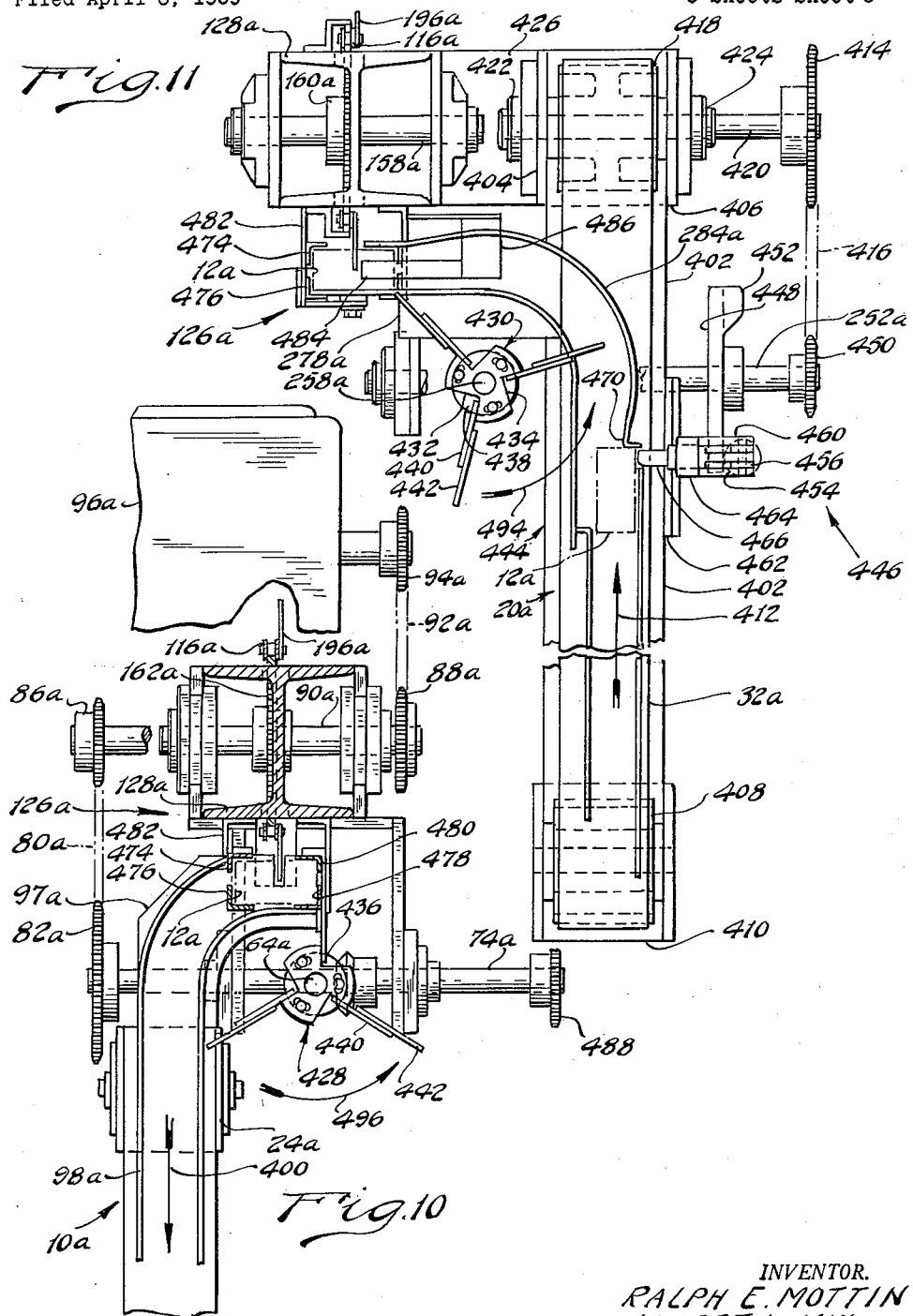

3,043,415
CONVEYOR
Ralph E. Mottin, Taylor, Albert L. Mix, Garden City, and Leland R. Srigley, Detroit, Mich., assignors to Parke, Davis & Company, Detroit, Mich., a corporation of Michigan
Filed Apr. 6, 1959, Ser. No. 804,395
14 Claims. (Cl. 198—20)

The present invention relates to automatic mechanical transfer apparatus, refers more specifically to apparatus for transferring objects at least partly vertically between a pair of transfer devices, and in a particular embodiment is directed to a device for automatically and continuously picking single objects from a transfer device, transferring the single objects substantially vertically and replacing the objects on a second transfer device while maintaining the original orientation of the objects.

In the pharmaceutical industry and in other industries such as cosmetics, foods and the like, medicines and other products are often placed in relatively small containers of tin, metal, plastic paper, glass and the like such as bottles for marketing. The final cleaning of the containers and the filling thereof with medicines or other products may be accomplished by a single automatic apparatus. In such cases the containers are commonly fed into the machine in a single line on a horizontal conveyor. In the past the containers have been delivered to the floor on which the cleaning and filling apparatus is stationed and in relatively close proximity thereto. The containers have then been unpackaged and placed on the conveyor feeding the cleaning and filling apparatus with empty containers.

The delivery and unpackaging of cases of containers in the vicinity of the final cleaning and filling apparatus is undesirable. It contaminates the air about the apparatus with dust and dirt and generally adds confusion to the final filling and cleaning area. The unpackaging and therefore the loading of the containers onto the conveyor should be at a point remote from the cleaning and filling device. It has been determined that in the interest of both cleanliness and plant efficiency that it would in many existing installations be most advantageous in the separating of the unpackaging and also the packaging operations from the cleaning and filling operation to unpackage the cases of containers on a floor level other than that of the cleaning and filling apparatus and to place the continers onto conveyor means for automatic transfer both horizontally and vertically to the cleaning and filling apparatus and subsequently to place the cleaned and filled containers onto conveyor means for automatic transfer both horizontally and vertically to the packaging area.

However, before the level at which the packaging and unpackaging of containers is accomplished can be separated from the level at which the cleaning and filling of the containers takes place it is necessary to provide means to convey the containers horizontally at the packing and unpacking level, to transfer them vertically between the cleaning and filling level and the packaging and unpackaging level, and to move them horizontally at the cleaning and filling level. In the past it has been known to transfer cans vertically by feeding them between adjacent traveling belts. However, such transfer means requires that the individual containers vary from one another by a small tolerance on the order of a few thousandths of an inch. The dimensions of glass or plastic bottles may vary much more than this. It has also been known to vertically transfer trays of containers intermittently. Such vertical transfer of the containers however requires that they be first loaded onto the trays and later unloaded therefrom before being raised or lowered. Each of the known types of vertical transfer apparatus were investigated and found unsuited for individually transferring containers between two traveling conveyors at different elevations.

Therefore it is one of the essential objects of the present invention to provide means for automatically transferring individual objects between upper and lower stations.

Another object is to provide means in combination with an upper and lower station to automatically transfer individual objects having a determined orientation between the upper and lower stations.

More specifically it is an object to provide vertical transfer means for individual objects comprising a substantially vertically moving linear member having spaced apart fingers projecting therefrom and guide means operably associated with the linear member so that an object placed in the guide means is transferred vertically in the guide means on the fingers projecting from the linear member.

Still more specifically it is an object to provide apparatus for transferring objects traveling on a horizontal conveyor at one level to a moving horizontal conveyor at a different level while maintaining the original orientation of the objects comprising apparatus including a spacing device for removing the objects individually from the conveyor at said one level and placing the objects so removed in position to be transferred to said different level, and vertical transfer means including an endless linear member moving substantially vertically and having fingers projecting from selected positions thereon, guide means operably associated with the linear member so that properly positioned individual containers are automatically transferred from said one level to said different level by said linear member on movement thereof, and apparatus including a second spacing device for removing the individual containers from the vertical transfer means at said different level and positioning them on a second moving horizontal conveyor at said different level.

Another object is to provide means to transfer individual objects from a first conveyor moving substantially horizontally at a first level to a second horizontally moving conveyor at a different level which means is simple in design, economical to manufacture, and efficient in use.

These and other objects, advantages and novel details of construction of this invention will be made more apparent as this description proceeds, especially when considered in connection with the accompanying drawings, wherein:

FIGURE 1–A is a side elevation of the lower part of a transfer apparatus according to the invention.

FIGURE 1–B is a side elevation of the upper part of the transfer apparatus of FIGURE 1–A.

FIGURE 2–A is a front elevation of the lower part of the transfer apparatus of FIGURE 1–A.

FIGURE 2–B is a front elevation of the upper part of the transfer apparatus of FIGURE 1–A.

FIGURE 3 is a cross-section of the transfer apparatus of FIGURE 1–A taken on the line 3–3 in FIGURE 1–A.

FIGURE 4 is a cross-section of the transfer apparatus of FIGURE 1–A taken on the line 4—4 in FIGURE 1–B.

FIGURE 5–A is an enlarged partial section of the transfer apparatus of FIGURE 1–A taken on the line 5–A—5–A in FIGURE 2–A.

FIGURE 5–B is an enlarged partial section of the transfer apparatus of FIGURE 1–A taken on the line 5–B—5–B in FIGURE 2–B.

FIGURE 6 is a cross-section of the transfer apparatus of FIGURE 1–A taken on the line 6—6 in FIGURE 1–A.

FIGURE 7 is a cross-section of the transfer apparatus of FIGURE 1–A taken on the line 7—7 in FIGURE 1–A.

FIGURE 8 is a partial section of the transfer apparatus of FIGURE 1–A taken on the line 8—8 in FIGURE 1–B.

FIGURE 9 is a partial front elevation of a modification of the transfer apparatus of FIGURES 1–8.

FIGURE 10 is a cross-section of the transfer apparatus of FIGURE 9 taken on the line 10—10 in FIGURE 9.

FIGURE 11 is a cross-section of the transfer apparatus of FIGURE 9 taken on the line 11—11 in FIGURE 9.

One embodiment of the transfer apparatus of the invention will now be described with particular reference to the drawings. The transfer apparatus illustrated includes a conveyor 10, for transferring containers 12 such as bottles horizontally, which may be located in a lower level compartment of an enclosure structure (not shown) wherein a container supply is maintained, a spacing device in the form of star wheel apparatus 14 for removing the containers 12 from conveyor 10 and positioning the containers so that they are picked up by an elevator 16, an elevator 16 for removing the containers from the star wheel apparatus 14 and elevating them, a second star wheel apparatus 18 for removing the containers 12 at the top of elevator 16 and positioning them on a second conveyor 20, and a second conveyor 20 which may be located in an upper level compartment of said enclosure structure for receiving containers from the star wheel apparatus 18 and transporting them horizontally to cleaning and filling apparatus (not shown). The star wheel apparatus 14 and 18 and the elevator 16 are mechanically synchronized so that in operation individual containers are automatically sequentially picked from conveyor 10, rotated into position for engagement by elevator 16, elevated by elevator 16, engaged by star wheel 18 and rotated thereby onto conveyor 20.

Conveyors 10 and 20 are similar in construction and operation and will therefore be considered together. Conveyor 10 as best shown in FIGURE 1–A comprises an endless belt 22, a drum 24 on which said endless belt is mounted at the end thereof adjacent said star wheel apparatus 14, and convenient mounting and drive means 26 and supports 28 for drum 24. As indicated by arrow 30 conveyor 10 is adapted to move in a counter-clockwise direction around drum 24 thereby advancing containers 12 positioned thereon to the left in FIGURE 1–A from a container supply source (not shown).

Conveyor 20 as best shown in FIGURE 1–B comprises an endless belt 32, a drum 34 on which belt 32 is mounted at the end thereof adjacent said star wheel apparatus 18, and mounting means 36 for drum 34 and supports 38 therefor. As indicated by arrow 40 conveyor 20 is adapted to move in a clockwise direction around drum 34 thereby advancing containers 12 positioned thereon to the right in FIGURE 1–B toward cleaning and filling apparatus (not shown).

It will be understood that both belts 22 and 32 will be mounted on supports and drums similar to supports 28 and 38 and drums 24 and 34 at intermediate points along the length thereof and at the ends thereof not shown in the figures. Belts 22 and 32 may be of any convenient material offering little resistance to sliding of bottles thereon such as relatively narrow metal plates attached to an endless chain. Drive means 26 may be for example an electric motor connected by appropriate belts or gears to drum 24. A similar drive means for conveyor 20 (not shown) may be attached to conveyor 20 at the end thereof (not shown) so that the top of the conveyor may always be in positive tension as the conveyor 20 is moved clockwise.

Star wheel apparatus 14 includes star wheel 42, suitable mounting and drive means 44 therefor, and guide means 46. Star wheel 42 as best shown in FIGURES 1–A and 3 is a flat generally circular member having identical arcuate recesses 48 equally spaced around the periphery thereof. Star wheel 42 is sandwiched between plates 50 and 52 and is secured thereto for rotation therewith by means of bolts 53 extending through plate 50 and star wheel 42 and threadably engaging plate 52 as best shown in FIGURES 1–A and 5–A.

Star wheel 42 is provided with arcuate aligning slots 54 through which bolts 53 extend. Star wheel 42 is therefore angularly positionable with respect to plates 50 and 52. A downwardly extending collar or hub 66 is provided on plate 52 as shown. Hub 66 is secured to a rotating shaft 64 by means of a set screw 55. The star wheel 42 may therefore be positioned vertically by means of set screw 55. A key 57 is provided between the shaft 64 and hub 66 of plate 52 to angularly locate and provide drive means for the star wheel 42 attached to hub 66 so that star wheel 42 properly engages bottles 12 and timely places them for engagement with elevator 16 as will later be considered.

Star wheel mounting and drive means 44 includes a bracket 56 supporting a bearing cylinder 58 having bearings 60 and 62 secured in the ends thereof in which a shaft 64 is journaled for rotation. Shaft 64 is driven by bevel gear 70 secured to the lower end of shaft 64 which is in engagement with a driven bevel gear 72. Bevel gear 72 is fixed to shaft 74 which is journaled for rotation in bearings 76 and 78 supported as shown by bracket 80. A sprocket 82 is secured to shaft 74 and is rotated by means of endless chain 84 which is connected by means of sprockets 86 and 88 on shaft 90, endless chain 92 and sprocket 94 to adjustable variable speed drive means 96. Rotation of sprocket 82 imparts rotary motion to shaft 64, hub 66 and star wheel 42 through shaft 74 and bevel gears 70 and 72.

Star wheel 42 mounted for rotation with shaft 64 as above indicated may be easily replaced along with the plates 50 and 52 which are attached thereto by merely loosening set screw 55 and lifting the star wheel and plates vertically from shaft 64 thereby disengaging key 57 and then sleeving the desired replacement star wheel 42 complete with different plates 50 and 52 over shaft 64, engaging key 57 and tightening set screw 55. Such replacement may be required with identical star wheels to continue operation of the transfer apparatus during the repair of a star wheel 42 or may be accomplished with a star wheel having different shaped recesses 48 therein so that the transfer apparatus will accommodate different size containers.

Guide means 46 associated with star wheel apparatus 14 comprises an apron plate 97 positioned parallel to the top of and alongside of conveyor 10 and under part of star wheel 42 as shown in FIGURE 3, parallel, horizontally extending guide tracks 98 for containers 12 leading from conveyor 10 and part way around star wheel 42 as shown, and suitable mounting brackets therefor 99 and 100. As indicated by arrow 101 containers 12 moved by conveyor 14 and moving on apron plate 97 approach star wheel 42 radially thereto between guide tracks 98. The containers 12 are engaged by recesses 48 in star wheel 42, rotated clockwise as indicated by arrow 102 into the position indicated at 103 where they may be picked up by elevator 16.

It will be noted that the section of guide tracks 98 extending around star wheel 42 is provided with yieldable portions 104 and 105. Portions 104 and 105 are provided with pivot means 106 and 107 respectively acting in conjunction with springs 108 and 109 mounted on pins 110 and 111 between brackets 112 and 113 and brackets 114 and 115 respectively as shown best in FIGURE 3. Yieldable section 105 is provided to more positively position containers 12 against star wheel 42 for engagement thereof by elevator 16.

Elevator 16 includes generally vertically extending endless chain 116, upper and lower mounting means therefor generally indicated 118 and 120, vertical support 122 for the mounting means, and drive means 124 for the endless chain 116. Elevator 16 also includes adjustable vertical guide means 126.

Vertical support 122 comprises an H-shaped structural section 128 positioned as shown best in FIGURES 1-A and 3 and secured to the floor of the lower level compartment of the enclosure previously mentioned by convenient means such as clip angles 130 and bolts 132. The structural section 128 has the web thereof removed in the vicinity of both star wheel apparatus 14 and 18 as shown in FIGURES 1-A and 1-B at 134 and 136 respectively. Vertical slots 138 and 140 and vertical slots 142 and 144 shown best in FIGURES 5-A and 5-B are provided centrally of the flanges 146 and 148 of the structural section 128 adjacent the area thereof having the removed web. The slots 138, 140, 142 and 144 are provided in structural section 128 in conjunction with the removal of the web of the section 128 at 134 and 136 to allow correct positioning of mounting means 118 and 120 on structural section 128.

Upper mounting means 118 for endless chain 116 as shown in FIGURE 8 comprises bearings 150 and 152 mounted in brackets 154 and 156 extending parallel to the web of the structural section 128 on both sides thereof and attached to the outer edges of flanges 146 and 148, a shaft 158 journaled for rotation in the bearings 150 and 152, and a sprocket 160 keyed to the shaft 158 between bearings 150 and 152 for rotation with the shaft 158.

The lower mounting means 120 for chain 116 shown best in FIGURE 6 is similar to upper mounting means 118. Sprocket 162 is keyed to shaft 90 for rotation therewith in bearings 166 and 168. Bearings 166 and 168 are secured in brackets 170 and 172. Brackets 170 and 172 formed as shown are vertically slidable on tracks 174, 176, 178 and 180 which are attached to the edges of flanges 146 and 148 of structural section 128 by convenient means such as welding. Vertical adjustment of brackets 170 and 172 and therefore sprocket 162 is accomplished by means of adjusting screws 182 and 184 shown best in FIGURE 1-A attached to the structural section 128 and to brackets 170 and 172 by convenient means such as brackets 186 and 190. Vertical adjustment of the lower sprocket 162 permits tightening or loosening of endless chain 116 extending between sprockets 160 and 162.

As shown best in FIGURES 5-A and 5-B, endless chain 116 is mounted on sprockets 160 and 162 for movement therearound and for movement therebetween in a primarily vertical direction. Chain 116 on sprockets 160 and 162 passes through the slots 138, 140, 142 and 144 in flanges 146 and 148 and extends along the length of the flanges along the outer surfaces thereof. Guides 192 mounted on brackets 194 are provided along the length of structural section 128 as shown to maintain chain 116 in close proximity to flanges 146 and 148.

Chain 116 as shown is provided with fingers 196 extending outwardly therefrom along the length thereof as shown best in FIGURES 5-A and 5-B. Fingers 196 are extensions of one side of particular links of chain 116. Fingers 196 are provided to serve as lifting means for containers 12. On counter-clockwise rotation of sprockets 160 and 162 the section of chain 116 on the right in FIGURES 5-A and 5-B will be moved in an upward direction. The fingers 196, extending perpendicularly from that section of the chain 116 are also moved upwardly as indicated by arrow 198. As the fingers 196 move upwardly containers 12 positioned as shown at 103 by star wheel apparatus 14 are engaged thereby and moved upward in guide means 126 to star wheel apparatus 18 where they are removed from guide means 126 as will be later explained.

Sprocket 88 secured to shaft 90 and rotated by chain 92 driven by sprocket 94 which is rotated by variable speed adjustable motor means 96 as previously indicated provides drive means 124 for chain 116. It will be noted that drive means 124 and drive means 44 of star wheel assembly 14 are driven by the same motor means 96 through sprocket and chain drives. Star wheel assembly 18 is also driven by means of a sprocket 200 on shaft 158 which is in driving relation to an endless chain 202 driving sprocket 204 of star wheel apparatus 18 as shown best in FIGURE 1-B. Therefore since shaft 158 is caused to rotate by motor means 96 through sprocket 160 it can be seen that star wheel apparatus 18 is also driven by motor means 96. The driving of each of star wheels 14 and 18 and endless chain 16 with sprockets and chains from the same motor means is important in the mechanical synchronization of these elements so that containers 12 are positioned by star wheel apparatus 14 to be engaged by fingers 196 in their upward movement as the fingers 196 reach the level of the apron 97 and so that the rotating star wheel apparatus 18 will be in the proper position to engage containers 12 as they reach the top of guide means 126 as will later be considered.

Adjustable vertical guide means 126 for containers 12 includes an inner guide track comprising spaced apart members 206 and 208 shaped as shown best in FIGURE 4 and attached to flange 148 of structural section 128 by convenient means such as brackets 209, an outer V-shaped guide track 210 secured to and supported by adjusting means 212, and adjusting means 212 for horizontally adjusting guide 210. As illustrated best in FIGURES 3 and 4 fingers 196 extend into the area defined by the guide tracks between spaced apart members 206 and 208.

It will be noted that guide track member 206 extends vertically slightly below star wheel 42 and slightly above an upper star wheel 214. Guide track members 208 and 210 extend vertically as shown from slightly above star wheel 42 to slightly below star wheel 214. Thus it is possible to rotate containers 12 counter-clockwise to a position as shown at 103 directly below guide means 126 for engagement by fingers 196 on chain 116 and to rotate containers 12 clockwise out of engagement with fingers 196 at the top of guide means 126 by means of star wheel 214.

In connection with the rotation of containers 12 into position 103 with star wheel 42 adjustable extensions 216 for both sides of track 210 are provided at the lower end thereof as shown in FIGURE 5-A to adjust the length of track 210 to different size containers 12. The extensions 216 are held in place by bolts 218 which may be selectively positioned in slots 220 thereby raising or lowering extensions 216. A leaf spring 221 is attached to the extension 216 on the left side of track 210 as shown in FIGURE 2-A by convenient means such as bolts to prevent containers 12 from tipping over due to circumferential momentum thereof about star wheel 42 as they are engaged by fingers 196 before they are lifted sufficiently thereby to be completely surrounded by guide tracks 206, 208 and 210.

As indicated best in FIGURES 1-A and 7 horizontal adjusting means 212 is provided for guide track 210. The adjusting means is provided so that containers of different size and shape may be elevated by elevator 16. Guide track 210 besides being movable toward and away from guide tracks 206 and 208 may of course be made any desired cross-section such as circular for example to accommodate different shaped containers such as round, oval, square, or blake bottles. The cross-section and angle of mounting of guide tracks 206 and 208 may also be varied for a similar reason.

Adjusting means 212 for guide track 210 comprises mounting brackets 222, spaced along the length of support means 122 and attached thereto by convenient means such as welding as shown, a mounting block 224 and shaft 226 slidably inserted in bearing 230 on cross member 232 of each bracket 222 to which the guide track 210 is secured by means such as bolts 228, a screw 234 having one end threaded in shaft 226 and the other end mounted for rotation in bearing 236 on cross member 238 of each bracket 222, a sprocket 240 secured to each screw 234, an endless chain 242 extending vertically as shown in contact with each sprocket 240, and auxiliary sprockets 244 and bearings 246 therefor mounted on L-shaped brackets 248 which are attached to brackets 222, the auxiliary sprockets are positioned as shown to insure engagement of chain 242 with sprockets 240.

Each of screws 234 is prevented from moving horizontally toward or away from guide track 210 by bearing cap 243 and the hub of sprocket 240. Therefore as sprocket 240 is rotated shaft 226 and block 224 carrying guide track 210 will be forced to slide in bearing 230 toward or away from chain 116. Sprockets 240 since they are each rotated by the same endless chain 242 are rotated the same amount and therefore cause guide track 210 to move toward chain 116 in a uniform manner along its entire length.

As best seen in FIGURE 7 the screw 234 associated with the lowest bracket 222 is extended through cross member 238 and a wheel and handle 250 are attached thereto to provide means to manually rotate sprocket 240 to drive chain 242 to thereby adjust guide track 210. Alternatively wheel 250 may be motor driven in any well known manner such as the manner in which sprocket 88 is driven for example.

The upper star wheel apparatus 18 is similar to the lower star wheel apparatus 14 previously described. As previously indicated the drive means therefor includes sprocket 200 mounted on driven shaft 158, sprocket 204 driving shaft 252 and endless chain 202 between sprockets 200 and 204. Shaft 252 is journaled for rotation in bearings 251 and 253 supported by bracket 255 on support 122. As with star wheel apparatus 14 shaft 252 drives a bevel gear 254 mounted thereon which in turn rotates a mating bevel gear 256 attached to the lower end of a shaft 258 which is journaled for rotation in bearings 260 and 262 supported in cylinder 264 carried by bracket 266 attached to support 122.

Star wheel 214 is sandwiched between plates 272 and 274 and is angularly adjustable with respect thereto in a manner similar to the adjustment between star wheel 42 and plates 50 and 52 previously discussed. As with plate 50 plate 274 is provided with hub 268 which is adjusted vertically on shaft 258 by means of a set screw 275. The hub 268 is secured for rotation to shaft 258 by means of key 270.

As will be seen in FIGURE 4 star wheel 214 is generally circular and is provided with spaced recesses 276 around the exterior thereof. It will be noted that the recesses 276 are of greater circumferential length than the recesses of star wheel 42 of apparatus 14. The extra length is necessary to enable containers 12 being lifted by elevator 16 to reach the proper height with respect to the star wheel before being engaged by the recess. This difference in star wheels necessitates different drive ratios therefore for proper synchronization of the transfer apparatus as indicated by different size sprockets 90, 200, 82 and 204.

As previously indicated in connection with star wheel 42, star wheel 214 is interchangeable with other similar star wheels having differently shaped recesses 276 by merely unfastening set screw 275 and lifting star wheel 214 and the attached plates 272 and 274 from shaft 258, sleeving the replacement star wheel including plates similar to 272 and 274 over shaft 258 engaging key 270, and securing set screw 275. Star wheel 214 is made interchangeable in the manner indicated to enable the transfer apparatus to handle different size containers 12 with a minimum of down time for change over of the apparatus to the new container size.

An apron 278 supported on brackets such as 280 and 282 is provided at the level of conveyor 20 onto which star wheel 214 moves containers 12 as they arrive at the star wheel on elevator 16. Guide tracks 284 are provided as shown in FIGURES 1–A and 4 secured to apron 278 by convenient means such as brackets and bolts 286 to guide containers 12 onto conveyor 20. That section of guide track 284 extending around star wheel 214 is provided with a yieldable portion 288 shaped as shown and pivotally mounted on pivot means 290 and resiliently held in contact with containers 12 as they are engaged by star wheel 214 by means of spring 292 mounted on pin 294 between brackets 296 and 298. The yieldable portion 288 is provided to firmly hold containers 12 against star wheel 214 to prevent tipping thereof as they are engaged by wheel 214 and rotated clockwise onto apron 278 for subsequent movement between guide tracks 284 toward conveyor 20 in the direction of arrow 300 in FIGURE 4.

In operation of the transfer apparatus described above, containers which are stored in or delivered to a lower level compartment of an enclosure are unpackaged and placed between guide tracks 98 on conveyor 10. Conveyor 10 is operated to advance the containers in single file toward star wheel apparatus 14. Guide tracks 98 are positioned with respect to star wheel 42 and conveyor 10 so that as the containers 12 approach star wheel 42 they are caused to move onto apron 97 and advance radially toward the star wheel 42. The containers 12 on the apron 97 are pushed toward the star wheel 42 by other containers 12 moving on conveyor 10. As previously indicated containers 12 will slip on the surface of conveyor 10 if containers are fed to star wheel 42 too fast thereby preventing piling up of the containers at wheel 42.

As previously indicated with motor 96 energized star wheel 42 is caused to rotate in a counter-clockwise direction, chain 116 proceeds in a counter-clockwise direction around sprockets 160 and 162 and star wheel 214 is rotated in a clockwise direction. With star wheel 42 rotating in a counter-clockwise direction, containers 12 approaching from the direction 101 on apron 97 are rotated in the direction 102 while held in a recess 48 to a position 103 directly beneath vertical guide means 126. In this rotation the containers 12 are prevented from being crushed between the star wheel 42 and guide portion 104 as the containers are contacted by star wheel 42 by making portion 104 of guide track 98 yieldable as previously considered. The correct positioning of containers 12 at 103 is assured by yieldable section 105 holding containers 12 against star wheel 42 in this position as shown in FIGURE 3.

When containers 12 reach position 103 they are individually engaged on the bottom by fingers 196 of chain 116 moving in an upward direction. The containers are then lifted by fingers 118 into vertical guide means 126 which guides the containers 12 in their upward travel on elevator 16. Leaf spring 221 is provided at the bottom of guide track 210 as shown to prevent containers 12 from tipping over due to their circumferential momentum as they are lifted by elevator 16.

When containers 12 reach the top of guide means 126 they enter recesses 276 of star wheel 214 at the side 302 thereof. By the time the bottom of containers 12 have been elevated to the height of apron 278 they are engaged by side 304 of recesses 276 and are rotated clockwise off fingers 196 onto apron 278. The containers 12 are prevented from falling over as they are removed from fingers 196 by the yieldable portion 288 of guide track 284 as previously indicated.

The containers 12 are then rotated clockwise by star wheel 214 and are positioned single file into guide track 284 from which they are pushed onto conveyor 20 which moves the containers 12 horizontally in the direction indicated.

It will be noted that the containers in the transfer just described have been maintained in an upright position so that anything placed within the containers before transfer thereof is accomplished will remain therein during the transfer of the containers. Also the containers have been automatically elevated individually between two conveyors which may be located on different floors in a building making it possible to conveniently separate the dusty and dirty receiving and storing area for the containers 12 from the cleaning and filling area. Furthermore it will readily be appreciated that the device disclosed has many applications in the vertical transferring of articles other than containers such as light bulbs for example in industries such as the bottle manufacturing industry or the light bulb manufacturing industry.

While the embodiment of the invention disclosed above is concerned with the elevation of objects, in the practice of the invention it should be remembered that the principles herein disclosed apply equally well to the lowering of variously shaped objects such as small metal parts, aerosol type cans, and round, oval, square, blake and odd shaped bottles of various sizes. In this regard a modification of the transfer apparatus shown in FIGURES 1-8 is illustrated in FIGURES 9-11. The modification shown in FIGURES 9-11 is particularly suited to the lowering of individual rectangular objects. The transfer apparatus of FIGURES 9-11 is in many respects the same as the embodiment of the invention previously described and therefore in the discussion of FIGURES 9-11 elements similar to those previously discussed will be given similar reference numbers followed by the suffix a and it should be understood that where mechanism is not discussed in detail that it is similar to the previously discussed mechanism.

The transfer apparatus of FIGURES 9-11 differs from that of FIGURES 1-8 in that the apparatus 14a and 18a, the guide means 126a and conveyors 10a and 20a have been modified.

Specifically the conveyor 10a as shown in FIGURE 10 which may be the same in structure as conveyor 10 is arranged to move objects received from star wheel apparatus 14a in the direction of arrow 400. Conveyor 20a as illustrated in FIGURES 9 and 11 is constructed so that belt 32a moves along the surface of a guide channel 402. Guide channel 402 is supported at the end adjacent apparatus 18a by vertical support members 404 and 406 as shown. At the other end belt 32a as shown is mounted for rotation around a drum 408 which is rotatably secured to a support 410. Belt 32a is driven to advance objects in the direction of arrow 412 by means of sprocket 414 and chain 416 which rotate drum 418 in a counter-clockwise direction. Drum 418 as shown is mounted for rotation on shaft 420 which is journaled for rotation in bearings 422 and 424 set in members 404 and 406 which are supported by structural member 128a on bracket 426 as shown. Belt 32a as shown may be made of narrow metal plates secured to a flat belt which is in frictional engagement with drums 408 and 418 or the belt 32a and the drums 408 and 418 may be the same as belt 32 and drum 24 previously described.

As shown in FIGURES 10 and 11 the star wheels 42 and 214 of the transfer apparatus shown in FIGURES 1-8 have been replaced by paddle wheels 428 and 430 in the modification of FIGURES 9-11. Paddle wheels 428 and 430 as shown include a central circular section 432 having three right angle notches 434 spaced around the circumference thereof which is sandwiched between a pair of plates 436 and 438 as shown. Arms 440 having paddles 442 attached to the ends thereof are secured to the central section 432 at one side of notches 434 as shown in FIGURES 10 and 11. Paddle wheels 428 and 430 are adjustable vertically and angularly with respect to and are driven by shafts 64a and 258a in the same manner as star wheels 42 and 214 are adjustable with respect to and driven by shafts 64 and 258.

The apron 97a and the guide tracks 98a formed and positioned with respect to paddle wheel 428 as shown in FIGURES 9 and 10 are provided to guide objects 12a onto conveyor 10a as they are removed from the downwardly traveling fingers 196a of chain 116a by paddle wheel 428. Similarly an apron 278a and guide tracks 284a formed and positioned with respect to paddle wheel 230 as shown in FIGURES 9 and 11 are provided to guide objects 12a as they are fed from conveyor 20a to paddle wheel 430 for positioning on fingers 196a in guide means 126a. Guide tracks 284a as shown are provided with an offset 444 positioned as shown which in conjunction with the cam actuated plunger means generally indicated 446 shown in FIGURES 9 and 11 acts to space objects arriving at offset 444 on conveyor 20a for correct engagement with paddle wheel 430.

The cam actuated plunger means 446 comprises a cam wheel 448 secured for rotation on an extension of shaft 252a. Shaft 252a provides drive means for paddle wheel 430 and chain 416 through sprocket 450 besides driving cam wheel 448. On rotation of cam wheel 448 cam surface 452 thereon engages the cam surface 454 on vertical lever 456 which is pivoted at 458 on bracket 460 attached to support 462 which is secured to guide channel 402 of conveyor 20a as shown. Lever 456 will pivot in a counter-clockwise direction about pivot 458 on contact of cam surfaces 452 and 454 in opposition to spring biasing means 463 which is mounted between guide member 464 which is secured to bracket 460 and lever 456. On counter-clockwise pivoting of lever 456 the plunger 466 is caused to move in the direction indicated by arrow 468 whereby a single object 12a is caused to clear the abutment 470 in guide tracks 284a caused by the offset 444 therein. The object 12a may then again be moved in the direction 412 by conveyor 20a for engagement with paddle wheel 430. As soon as the abutment 472 on cam wheel 448 rotates past cam surface 454 on lever 456 the cam actuated plunger means 446 will assume the position shown under bias from spring 463 allowing conveyor 20a to position another object 12a against abutment 470 as shown.

Guide mechanism 126a as shown includes four angle guide members 474, 476, 478 and 480 connected as shown to structural member 128a by spaced brackets 482. As shown the guide members are not adjustable as is guide member 210 previously discussed. It would, of course, be possible to make the guide members adjustable in the same manner that guide 210 is adjusted. Guide members 474 and 476 extend from above paddle wheel 430 to a position above paddle wheel 428 as shown in FIGURE 9. Guide members 478 and 480 extend from below paddle wheel 430 to a position above paddle wheel 428 also as shown. These relative positions for the guide members are provided to facilitate the entry into and the exit from the guide means of objects 12a.

A leaf spring 484 is mounted on a bracket 486 attached to structural member 128a at the top of guide means 126a. Leaf spring 484 prevents objects 12a from tipping as they are positioned over guide means 126a by paddle wheel 430.

The drive means for paddle wheels 228 and 230, the cam actuated plunger means 446 and the conveyor 20a as best shown in FIGURE 9 is analogous to the drive means for the transfer apparatus previously described. A sprocket 86a is provided which may be driven in a counter-clockwise direction, by appropriate means (not shown) connected to a drive motor 96a, to impart counter-clockwise rotation to paddle wheels 428 and 430 and cam wheel 448 and to cause the top of conveyor 20a to advance in the direction of arrow 412 through chain 80a, sprocket 82a, shaft 74a, sprocket 488, chain 490, sprocket 204a, shaft 252a, sprocket 450, chain 416, sprocket 414 and shaft 420. The chain 116a is driven in a clockwise direction by drive motor 96a through sprockets 94a and 88a and chain 92a as shown to lower objects 12a placed on fingers 196a of chain 116a by paddle wheel 430. It will be understood that gearing or other means to obtain the above indicated direction of rotation of the members of the modified transfer apparatus from a drive motor 96 is contemplated. Since the apparatus necessary to obtain the indicated movement of the members of the modified transfer apparatus are well known they will not be considered in detail herein.

Likewise it will be noted but not considered in detail that the mounting means for paddle wheels 428 and 430 of the modified transfer device have been moved with respect to structural member 128a to properly align the paddle wheels with respect to guide means 126a and endless chain 116a. The moving of the paddle wheels 428 and 430 has required additional bracket members such as 492 to be attached to structural member 128a as shown. In other respects the mounting means for paddle wheels 428 and 430 are similar to those for star wheels 42 and 214.

In operation an object 12a on conveyor 20a which is rectangular in cross-section as shown is advanced toward the offset 444 in guide tracks 284a by conveyor 20a and comes to rest against abutment 470. As shaft 252a is caused to rotate by drive motor 96a as indicated, cam wheel 448 causes lever 456 to pivot counter-clockwise about pivot 458 whereby plunger 466 guided by guide means 464 is moved in the direction 468 causing the object 12a abutting the offset 470 to clear the offset 470.

The object 12a is then advanced into position to be contacted by paddle wheel 430 rotating in the direction indicated by arrow 494 and another object 12a is positioned against abutment 470. Paddle wheel 430 sweeps the objects 12a one at a time as they clear abutment 470 into position directly over guide means 126a. The individual objects 12a on arriving at a position over guide means 126a are dropped a short distance in guide means 126a onto a descending finger 196a of endless chain 116a. The objects 12a are maintained in an upright position as they are positioned above guide means 12a by leaf spring 484.

The individual objects 12a are lowered in guide means 126a on individual fingers 196a by chain 116a traveling in a clockwise direction around sprocket 160a. As the bottom of the objects 12a closely approach the level of the apron 97a during their downward travel they are swept off fingers 196a onto apron 97a and then to conveyor 10a by paddle wheel 428 rotating in the direction indicated by arrow 496 in FIGURE 10.

In the lowering operation just described it will be understood that the plunger 466, the paddle wheels 428 and 430 and the chain 116a must be synchronized so that individual objects 12a are dropped onto fingers 196a immediately after the fingers pass the level of apron 498a in their downward travel and so that the objects 12a are swept off fingers 196a just as they approach the level of apron 97a. This synchronization may be accomplished by proper choice of the drive means for the elements involved as indicated in the discussion of the transfer apparatus first described.

Thus it can be seen that the transfer apparatus of the invention with but slight modification will function either as an elevator to lift individual objects such as bottles or other containers having various shapes from a lower to a higher level or as a lowerator to lower similar objects from a higher level to a lower level.

What we claim as our invention is:

1. Transfer apparatus for transferring objects having a vertical axis between different elevations while maintaining said axis vertical, comprising a pair of transfer devices at said different elevations operable to receive said objects having a vertical axis and move them substantially horizontally and means between said transfer devices operable to successively pick off individual objects having a vertical axis from one of said pair of transfer devices, transfer them substantially vertically between said transfer devices, and position them on the other of said transfer devices while maintaining said axis vertical, the last mentioned means including vertical transfer means, comprising vertically extending guide means positioned to receive the objects with their axes vertical directly from said one transfer device for vertically guiding the objects during vertical transfer thereof, a section of an endless linear member positioned adjacent said guide means for substantially vertical movement along said guide means and having spaced apart fingers attached thereto and extending outwardly therefrom and into said guide means, said fingers being operable in conjunction with said guide means to vertically transfer objects in registration with said guide means on vertical movement of said section of linear member, and means to impart vertical movement to said section of linear member.

2. Transfer apparatus for transferring objects between different elevations, the objects comprising round, oval or other similarly shaped objects having a vertical surface which is curved in horizontal section, said apparatus comprising a pair of transfer devices at different elevations operable to receive said objects and move them substantially horizontally and means between said transfer devices operable to successively pick off individual objects from one of said pair of transfer devices, transfer them substantially vertically between said transfer devices, and position them on the other of said transfer devices, the last mentioned means including vertical transfer means, comprising guide means including first and second vertical tracks spaced horizontally apart for slidably receiving the objects therebetween during vertical transfer thereof, said first track having a V-shaped surface facing said second track for centering the objects therebetween and being adjustably mounted for movement towards and away from said second track, a section of an endless linear member positioned adjacent said second track of said guide means for substantially vertical movement along said guide means and having spaced apart fingers attached thereto and extending outwardly therefrom and into said guide means, said fingers being operable in conjunction with said guide means to vertically transfer objects in registration with said guide means on vertical movement of said section of linear member, and means to impart vertical movement to said section of linear member.

3. Transfer apparatus for transferring objects between compartments of an enclosure structure located at different elevations, comprising a pair of transfer devices one located at each of the different elevations operable to receive said objects with a predetermined orientation and move them substantially horizontally and vertical transfer means between said transfer devices operable to successively pick off individual objects from one of said pair of transfer devices, transfer them substantially vertically between said transfer devices, and position them on the other of said transfer devices, said vertical transfer means comprising vertically extending guide means positioned to receive the objects in said predetermined orientation for vertically guiding the objects during vertical transfer thereof, a section of an endless linear member positioned adjacent said guide means for substantially vertical movement along said guide means and having spaced apart fingers attached thereto and extending outwardly therefrom and into said guide means, an object spacing device operably associated with said one of said transfer devices to position objects from said one transfer device in registration with said vertically extending guide means while maintaining said predetermined orientation of the objects, said fingers being operable in conjunction with said guide means to vertically transfer objects in registration with said guide means on vertical movement of said section of linear member, and means to impart vertical movement to said section of linear member, and a second object spacing device operably associated with the other of said transfer devices and said vertically extending guide means to remove said objects from said vertically extending guide means and position them on said other transfer device while maintaining said predetermined orientation of the objects.

4. Transfer apparatus for transferring objects between different elevations, comprising a pair of transfer devices at different elevations operable to receive said objects and move them substantially horizontally and means between said transfer devices operable to successively pick off individual objects from one of said pair of transfer devices, transfer them substantially vertically between said transfer devices, and position them on the other of said transfer devices, the last mentioned means including vertical transfer means, comprising guide means for the objects during vertical transfer thereof, a section of an endless linear member positioned adjacent said guide means for substantially vertical movement along said guide means and having spaced apart fingers attached thereto and extending outwardly therefrom and into said guide means, an object spacing device operably associated with one of said transfer devices to position objects from said one transfer device in registration with said guide means, said fingers being operable in conjunction with said guide means to vertically transfer objects in registration with said guide means on vertical movement of said section of linear member, and means to impart vertical movement to said section of linear member, and a second object spacing device operably associated with the other of said transfer devices and guide means to remove said objects from said guide means and position them on said other transfer device, one of said spacing devices comprising a continuously rotating structure rotated about an axis substantially parallel to said guide means and having a peripheral opening adapted to receive the objects individually for propelling the objects in a plane substantially perpendicular to said guide means, the opening of said one spacing device having a sufficiently greater circumferential length than the corresponding dimension of the object to permit passage of the object vertically through the opening while the opening is in registry with said guide means, and means to mechanically synchronize said spacing devices and said means to impart movement to said linear member to cause each object to be transferred vertically as soon as it is placed in registration with said guide means and to be removed from said guide means as soon as it arrives at said second spacing device.

5. Transfer apparatus for transferring objects between different elevations, comprising a pair of transfer devices at different elevations operable to receive said objects and move them substantially horizontally and means between said transfer devices operable to successively pick off individual objects from one of said pair of transfer devices, transfer them substantially vertically between said transfer devices, and position them on the other of said transfer devices, the last mentioned means including vertical transfer means, comprising vertically extending guide means for the objects during vertical transfer thereof, a section of an endless linear member positioned adjacent said guide means for substantially vertical movement along said guide means and having spaced apart fingers attached thereto and extending outwardly therefrom and into said guide means, an object spacing device operably associated with one of said transfer devices to position objects from said one transfer device in registration with said vertically extending guide means, said fingers being operable in conjunction with said guide means to vertically transfer objects in registration with said guide means on vertical movement of said section of linear member, and means to impart vertical movement to said section of linear member, and a second object spacing device operably associated with the other of said transfer device and vertically extending guide means to remove said objects from said vertically extending guide means and position them on said other transfer device, said vertically extending guide means having a movable portion extending parallel to the path of movement of the objects which is adjustable in a direction transverse to such path to facilitate the vertical transfer of different size objects.

6. A transfer device for vertically transferring individual objects such as glass bottles and the like between a pair of conveyors at different levels without tipping said objects, comprising vertically extending guide means for the objects during vertical transfer thereof, a section of an endless linear member arranged for substantially vertical movement along side of said guide means and having spaced apart fingers attached thereto and extending outwardly therefrom and into said guide means, a spacing device rotatable about an axis substantially parallel to said guide means and operably associated with one of said conveyors and said vertically extending guide means, said spacing device having a peripheral opening adapted to receive one of the objects arriving at said spacing device from said one conveyor and propel the object into registration with said vertically extending guide means without tipping said objects, said fingers being operable in conjunction with said guiding means to vertically transfer objects positioned in registration with said guide means on vertical movement of said section of linear member without tipping said objects, and means to impart vertical movement to said section of linear member.

7. A transfer device for vertically transferring individual objects such as rectangularly shaped cartons for glass bottles and the like between a pair of conveyors at different levels without tipping said objects, comprising vertically extending guide means for slidably guiding the objects during vertical transfer thereof, a section of an endless linear member arranged for substantially vertical movement along side of said guide means and having spaced apart fingers attached thereto and extending outwardly therefrom and into said guide means, a spacing device comprising a paddle wheel operably associated with one of said conveyors and said vertically extending guide means to position objects arriving at said spacing device from said one conveyor in registration with said vertically extending guide means without tipping said objects, said fingers being operable in conjunction with said guiding means to vertically transfer objects positioned in registration with said guide means on vertical movement of said section of linear member without tipping said objects, and means to impart vertical movement to said section of linear member, and a second spacing device comprising another paddle wheel operably associated with the other of said conveyors and said vertically extending guide means to remove said objects from said vertically extending guide means and position them on said other conveyor without tipping said objects.

8. A transfer device for vertically transferring individual objects such as glass bottles and the like between a pair of conveyors at different levels without tipping said objects, comprising guide means for the objects during vertical transfer thereof, a section of an endless linear member arranged for substantially vertical movement along side of said guide means and having spaced apart fingers attached thereto and extending outwardly therefrom and into said guide means, a spacing device operably associated with one of said conveyors and said guide means to position objects arriving at said spacing device from said one conveyor in registration with said guide means without tipping said objects, said fingers being operable in conjunction with said guiding means to vertically transfer objects positioned in registration with said guide means on vertical movement of said section of linear member without tipping said objects, and means to impart vertical movement to said section of linear member, and a second spacing device operably associated with the other of said conveyors and said guide means to remove said objects from said guide means and position them on said other conveyor without tipping said objects, and mechanical means to synchronize the movement of said spacing devices and said linear member to cause each object to be transferred vertically as soon as it is placed in registration with said guide means and to be removed from said guide means as soon as it arrives at said second spacing device, one of said spacing devices comprising a continuously rotating structure rotatable at the upper level about an axis substantially parallel to said guide means and having a peripheral opening adapted to receive the objects individually for propelling the objects in a plane substantially perpendicular to said guide means, said opening having a sufficiently greater circumferential length than the corresponding dimension of the object to permit passage of the objects vertically therethrough while the opening is in registry with said guide means.

9. A transfer device for vertically transferring individual objects such as cylindrical glass bottles and the like between a pair of conveyors at different levels without tipping said objects, comprising vertically extending guide means for the objects during vertical transfer thereof, a section of an endless linear member arranged for substantially vertical movement along side of said guide means and having spaced apart fingers attached thereto and extending outwardly therefrom and into said guide means, a spacing device comprising a star wheel operably associated with one of said conveyors and said vertically extending guide means to position objects arriving at said spacing device from said one conveyor in registration with said vertically extending guide means without tipping said objects, said fingers being operable in conjunction with said guiding means to vertically transfer objects positioned in registration with said guide means on vertical movement of said section of linear member without tipping said objects, and means to impart vertical movement to said section of said linear member, and a second spacing device comprising another star wheel operably associated with the other of said conveyors and said vertically extending guide means to remove said objects from said vertically extending guide means and position them on said other conveyor without tipping said objects, said spacing devices being replaceable and said guide means being adjustable to facilitate the vertical transferring of different size objects.

10. A transfer device for vertically transferring individual objects such as rectangularly shaped cartons for glass bottles and the like between a pair of conveyors at different levels without tipping said objects, comprising vertically extending guide means for the objects during vertical transfer thereof, a section of an endless linear member arranged for substantially vertical movement along side of said guide means and having spaced apart fingers attached thereto and extending outwardly therefrom and into said guide means, a spacing device comprising a paddle wheel operably associated with one of said conveyors and said vertically extending guide means to position objects arriving at said spacing device from said one conveyor in registration with said vertically extending guide means without tipping said objects, said fingers being operable in conjunction with said guiding means to vertically transfer objects positioned in registration with said guide means on vertical movement of said section of linear member without tipping said objects, and means to impart vertical movement to said section of linear member, and a second spacing device comprising another paddle wheel operably associated with the other of said conveyors and said vertically extending guide means to remove said objects from said vertically extending guide means and position them on said other conveyor without tipping said objects, and means operably associated with said one of said spacing devices to feed individual objects thereto in spaced relation.

11. The structure as recited in claim 10 wherein said last mentioned means includes a conveyor operable to advance objects toward said one spacing device, a guide track operably associated with said conveyor for guiding the movement of objects thereon, said guide track having an offset therein formed to halt the advance of objects on said conveyor toward said spacing device, and a cam actuated plunger operably associated with said guide track and synchronized with said spacing device to position objects arriving at said offset in said guide track for further movement on said conveyor toward said spacing device at predetermined intervals.

12. A transfer device for vertically transferring individual objects such as glass bottles and the like between a pair of conveyors at different levels without tipping said objects, comprising vertically extending guide means for the objects during vertical transfer thereof, a section of an endless linear member arranged for substantially vertical movement along side of said guide means and having spaced apart fingers attached thereto and extending outwardly therefrom and into said guide means, a spacing device operably associated with one of said conveyors and said vertically extending guide means to position objects arriving at said spacing device from said one conveyor in registration with said vertically extending guide means without tipping said objects, said fingers being operable in conjunction with said guiding means to vertically transfer objects positioned in registration with said guide means on vertical movement of said section of linear member without tipping said objects, and means to impart vertical movement to said section of linear member, and a second spacing device operably associated with the other of said conveyors and said vertically extending guide means to remove said objects from said vertically extending guide means and position them on said other conveyor without tipping said objects, and spring means associated with one end of said vertically extending guide means to prevent said objects from tipping over before registration thereof with said guide means.

13. The combination set forth in claim 12 wherein said guide means includes a vertical track member having one end thereof positioned near said first spacing device, and wherein said spring means comprises a leaf spring joined at one end to said one end of said track member to form a flexible extension thereof, the free end of said leaf spring being positioned clear of contact with said first spacing device and in the path of the objects being fed therefrom to said guide means for absorbing the horizontal momentum of the objects and initially guiding them vertically into said guide means as they are moved vertically by said fingers.

14. Transfer apparatus comprising a pair of transfer devices at different elevations, said transfer devices each including a substantially horizontal support and propelling means for successively moving the objects along said horizontal support with the objects in a predetermined orientation, guide means extending vertically between said transfer devices for slidably guiding the objects during successive vertical transfer thereof while maintaining said predetermined orientation thereof, and linear conveyor means having a vertical run adjacent said vertically extending guide means, said conveyor means further having spaced apart supporting means adapted to travel along said guide means, said supporting means forming at said vertical run substantially horizontal supporting surfaces for the objects while traveling vertically along said guide means, said propelling means being operably associated with said vertical run and said linear conveyor means being synchronized with the transfer devices so that said supporting means at said vertical run successively receive individual objects from the horizontal support of one of said transfer devices, transport them in said predetermined orientation vertically along said guide means and position them, while traveling in said vertical run, in registry with the horizontal support of said other transfer device for removal from the path of travel of the conveyor supporting means by said other transfer device.

References Cited in the file of this patent

UNITED STATES PATENTS

| | | |
|---|---|---|
| 1,218,315 | Redd | Mar. 6, 1917 |
| 1,422,229 | Sharp | July 11, 1922 |
| 1,506,843 | Komarnisky | Sept. 2, 1924 |
| 1,844,869 | Hauger et al. | Feb. 9, 1932 |
| 2,111,892 | Horner | Mar. 22, 1938 |
| 2,286,250 | Albertoli | June 16, 1942 |
| 2,369,575 | Kay | Feb. 13, 1945 |
| 2,383,528 | Winters | Aug. 28, 1945 |
| 2,609,079 | Thompson | Sept. 2, 1952 |
| 2,854,125 | Johnson | Sept. 30, 1958 |

FOREIGN PATENTS

| | | |
|---|---|---|
| 704,938 | France | Mar. 2, 1931 |